(12) United States Patent
Ballapuram et al.

(10) Patent No.: US 11,841,796 B2
(45) Date of Patent: Dec. 12, 2023

(54) SCRATCHPAD MEMORY IN A CACHE

(71) Applicant: Micron Technology, Inc., Boise, ID (US)

(72) Inventors: Chinnakrishnan Ballapuram, San Jose, CA (US); Saira Samar Malik, Lafayette, IN (US); Taeksang Song, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 17/569,336

(22) Filed: Jan. 5, 2022

(65) Prior Publication Data

US 2022/0229778 A1   Jul. 21, 2022

Related U.S. Application Data

(60) Provisional application No. 63/140,094, filed on Jan. 21, 2021.

(51) Int. Cl.
| | |
|---|---|
| *G06F 12/0802* | (2016.01) |
| *G06F 12/0888* | (2016.01) |
| *G06F 12/0868* | (2016.01) |
| *G06F 12/02* | (2006.01) |
| *G11C 5/10* | (2006.01) |
| *G11C 5/02* | (2006.01) |

(52) U.S. Cl.
CPC ...... *G06F 12/0802* (2013.01); *G06F 2212/60* (2013.01)

(58) Field of Classification Search
CPC .................. G06F 12/0802; G06F 2212/60
USPC ............................................... 711/221
See application file for complete search history.

(56) References Cited

U.S. PATENT DOCUMENTS

| | | | |
|---|---|---|---|
| 2002/0007442 A1* | 1/2002 | Farrall | G06F 9/30047 711/134 |
| 2013/0268728 A1* | 10/2013 | Ramanujan | G06F 12/0893 711/143 |
| 2016/0275020 A1* | 9/2016 | Huang | G06F 12/1433 |
| 2022/0011951 A1* | 1/2022 | Roumi | G06F 3/0679 |
| 2022/0130841 A1* | 4/2022 | Kim | H10B 12/50 |

* cited by examiner

*Primary Examiner* — Arpan P. Savla
*Assistant Examiner* — Sidney Li
(74) *Attorney, Agent, or Firm* — Holland & Hart LLP

(57) ABSTRACT

Methods, systems, and devices for scratchpad memory in a cache are described. A device may operate a portion of a volatile memory in a cache mode having non-deterministic latency for satisfying requests from a host device. The device may monitor a register with an output pin that is associated with the portion and indicative of an operating mode of the portion. Based on or in response to monitoring the output pin, the device may determine whether to change the operating mode of the portion from the cache mode to a scratchpad mode having deterministic latency for satisfying requests from the host device.

25 Claims, 8 Drawing Sheets

SCRATCHPAD MEMORY IN A CACHE

CROSS REFERENCE

The present application for patent claims priority to U.S. Provisional Patent Application No. 63/140,094 by Ballapuram et al., entitled "SCRATCHPAD MEMORY IN A CACHE", filed Jan. 21, 2021, which is assigned to the assignee hereof and is expressly incorporated by reference in its entirety herein.

FIELD OF TECHNOLOGY

The following relates generally to one or more systems for memory and more specifically to scratchpad memory in a cache.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

A device, such as an electronic device, may include a non-volatile memory (e.g., a primary memory for storing information among other operations) and a volatile memory (e.g., a secondary memory) that may operate as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory, among other aspects. Operation of the volatile memory as a cache (or "in cache mode") may result in non-deterministic latency for satisfying requests from a host device because the memory used to satisfy the requests may vary, among other reasons. For example, the volatile memory may be used to satisfy requests that target data present in the volatile memory, whereas the non-volatile memory—which may have a longer access time than the volatile memory—may be used to satisfy requests that target data absent from the volatile memory. But non-deterministic latency may be inappropriate for certain applications or in certain scenarios and may cause system and device performance to suffer.

According to the techniques described herein, a device may operate a portion of the volatile memory as a scratchpad (or "in a scratchpad mode") so that certain requests from the host device can be satisfied with deterministic latency. In the scratchpad mode, requests that implicate the portion may be satisfied exclusively by the volatile memory and non-deterministic latency operations used in the cache mode may be avoided, thereby allowing the device to operate according to deterministic latency. To accommodate fluctuating demand for deterministic memory operations, the device may be configured to dynamically adjust the size of the portion that is operated in the scratchpad mode. For example, the device may switch the operating mode of a region of the volatile memory from the cache mode to the scratchpad mode, thereby increasing the size of the scratchpad portion. As another example, the device may switch the operating mode of a region of the volatile memory from the scratchpad mode to the cache mode, thereby decreasing the size of the scratchpad portion.

Features of the disclosure are initially described in the context of a system and a memory subsystem as described with reference to FIGS. 1 and 2. Features of the disclosure are described in the context of a device, as described with reference to FIG. 3, and process flows, as described with reference to FIGS. 4 and 5. These and other features of the disclosure are further illustrated by and described with reference to an apparatus diagram and flowcharts that relate to a dynamic scratchpad in a cache as described with reference to FIGS. 6-8.

Figure 1:
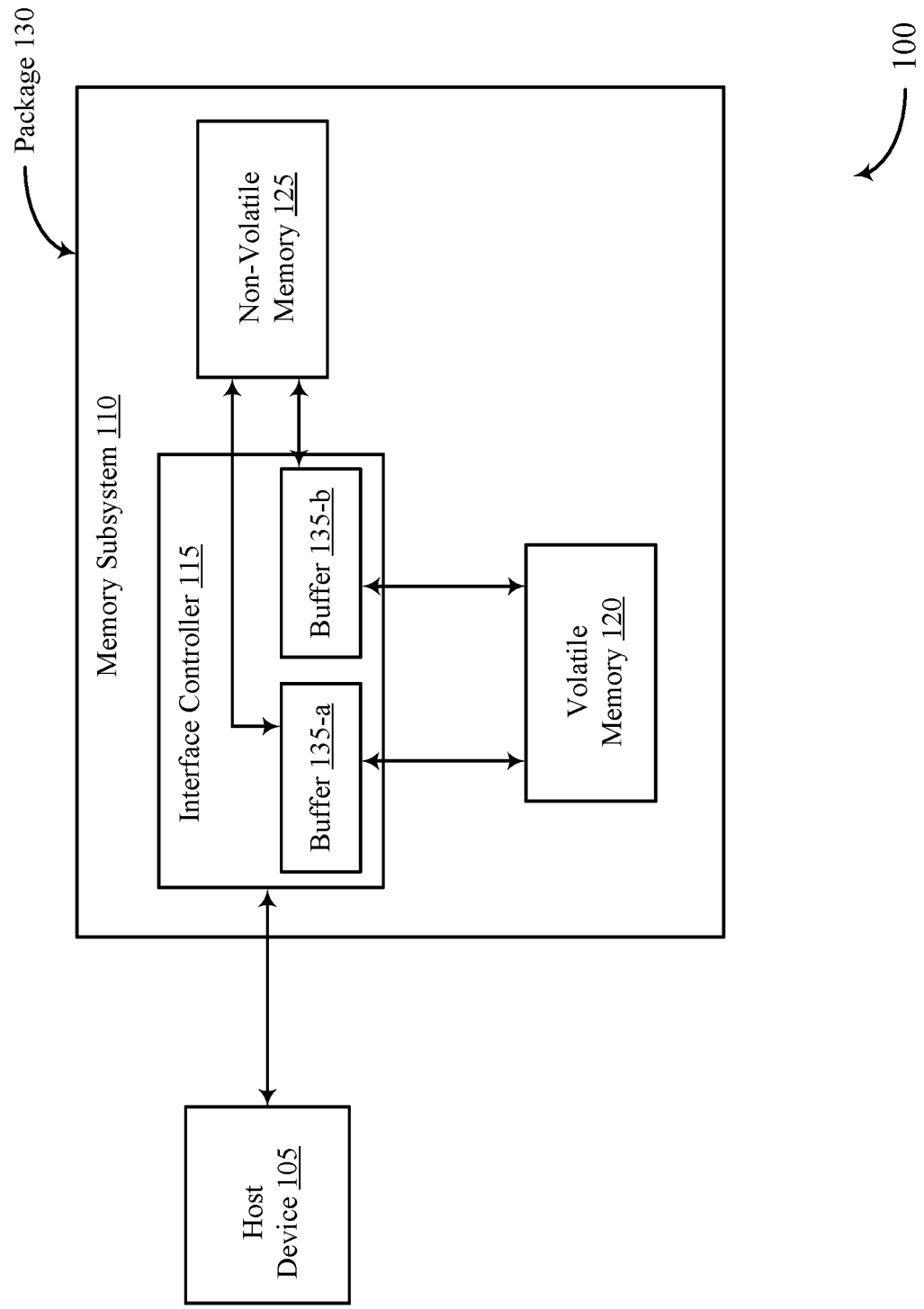
FIG. 1 illustrates an example of a system that supports scratchpad memory in a cache in accordance with examples as disclosed herein.

FIG. 1 illustrates an example of a system 100 that supports scratchpad memory in a cache in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on or in response to one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64B) or 128 bytes (128B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set of one or more non-volatile memory cells in the non-volatile memory 125 may be mapped to multiple sets (e.g., rows) of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 store the data based on or in response to one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105.

In general, the term "hit" may be used to refer to the scenario where the volatile memory 120 stores data targeted by the host device 105. If the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that then sets of volatile memory cells do not store the requested data, as described with reference to FIGS. 4 and 5) so that it can be transmitted to the host device 105. In general, the term "miss" may be used to refer to the scenario where the volatile memory 120 does not store data targeted by the host device 105.

More specifically, a write hit may refer to the scenario where data in the volatile memory 120 is associated with (e.g., matches data stored at) a non-volatile memory address targeted by a write command from the host device; whereas a write miss may refer to the scenario where data associated with the non-volatile memory address is absent from the volatile memory 120.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But then sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data. In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., if interface controller operates in one mode such as a write-back mode), dirty data may be data that is present in the volatile memory 120 but not present in the non-volatile memory 125.

So, the interface controller 115 may perform an eviction procedure to save data from the volatile memory 120 to the non-volatile memory 125 if the volatile memory 120 is full (e.g., to make space for new data in the volatile memory 120). In some examples, the interface controller 115 may perform a "fill" procedure in which data from the non-volatile memory 125 is saved to the volatile memory 120. The interface controller 115 may perform a fill procedure in the event of a miss (e.g., to populate the volatile memory 120 with relevant data). For example, in the event of a read miss, which occurs if a read command from the host device 105 targets data absent from the volatile memory 120, the interface controller 115 may retrieve the data requested by the read command and, in addition to returning it to the host device, store it in the volatile memory 120 (e.g., so that the data can be retrieved quickly in the future).

Thus, the memory subsystem 110 may satisfy (or "fulfill") requests (e.g., read commands, write commands) from the host device 105 using either the volatile memory 120 or the non-volatile memory 125, depending on the hit or miss status of the request. For example, in the event of a read miss, the read command from the host device 105 may be satisfied by the non-volatile memory 125, which means that the data returned from the host device 105 may originate from the non-volatile memory 125. And in the event of a read hit, the read command from the host device 105 may be satisfied by the volatile memory 120, which means that the data returned from the host device 105 may originate from the volatile memory 120.

But the volatile memory 120 and the non-volatile memory may have different latencies for accessing memory cells (or "access latency"), which means that the latency associated with satisfying a request from the host device 105 may be non-deterministic (e.g., unpredictable, unknown). Access latency may refer to the amount of time it takes the memory subsystem 110 to satisfy (or "fulfill") a request from the host device 105 and may be measured relative to receipt of the request. Variation in access latency due to the different architectures of the volatile memory 120 and the non-volatile memory 125 may be further exacerbated by the unpredictable use of eviction and fill procedures if the volatile memory 120 is operated in the cache mode. For example, the latency with satisfying a write command (referred to as "write latency") may vary depending on whether an eviction procedure is implemented to make room for the write data in the volatile memory 120.

According to the techniques described herein, the memory subsystem 110 may provide deterministic latency to the host device 105, among other advantages, by operating a portion of the volatile memory 120 in the scratchpad mode. If operating the portion of the volatile memory 120 in the scratchpad mode, the memory subsystem 110 may avoid eviction procedures and fill procedures used in the cache mode and may ensure that requests from the host device 105 are satisfied using the volatile memory 120. In some examples, the memory subsystem 110 may dynamically adjust the size of the portion operated in the scratchpad mode (e.g., based on or in response to control signaling from the host device 105).

The system 100 may include any quantity of non-transitory computer readable media that support a scratchpad memory in a cache. For example, the host device 105, the interface controller 115, the volatile memory 120, or the non-volatile memory 125 may include or otherwise may access one or more non-transitory computer readable media storing instructions (e.g., firmware) for performing the functions ascribed herein to the host device 105, the interface controller 115, the volatile memory 120, or the non-volatile memory 125. For example, such instructions, when executed by the host device 105 (e.g., by a host device controller), by the interface controller 115, by the volatile memory 120 (e.g., by a local controller), or by the non-volatile memory 125 (e.g., by a local controller), may cause the host device 105, the interface controller 115, the volatile memory 120, or the non-volatile memory 125 to perform associated functions as described herein.

Figure 2:
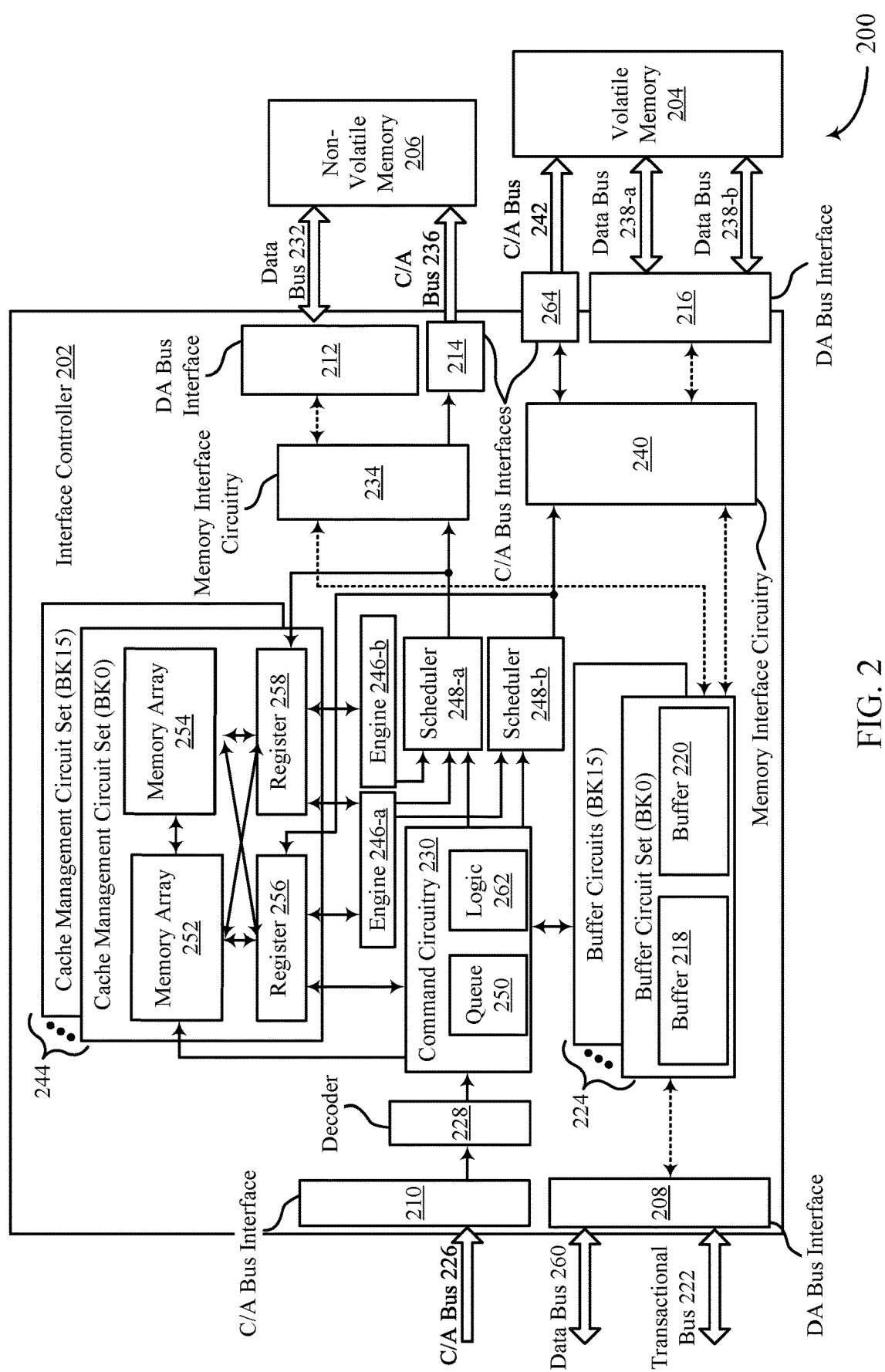
FIG. 2 illustrates an example of a memory subsystem that supports scratchpad memory in a cache in accordance with examples as disclosed herein.

FIG. 2 illustrates an example of a memory subsystem 200 that supports scratchpad memory in a cache in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the quantity of memory cells or column addresses in a row, or the quantity of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64B).

A smaller page size of an FeRAM array may provide various efficiency benefits, as an individual FeRAM cell may need more power to read or write than an individual DRAM cell. For example, a smaller page size for an FeRAM array may facilitate effective energy usage because a smaller quantity of FeRAM cells may be activated if an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may need more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the quantity of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any quantity of data buses 260 and any quantity of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a Cache DRAM (CDRAM) Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as static RAM (SRAM) cells.

Storage information (or "metadata") may include content information, validity information, or dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells if actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32B or 64B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32B or 64B) of data stored in row of BK0 of the volatile memory 204. Storing storage information (e.g., tag information, validity information) on a per-row basis in the memory array 252 may allow the interface controller 202 to determine whether there is a hit or miss for data in the volatile memory 204. Storing storage information (e.g., validity information, dirty information) on a sub-block basis in the memory array 254 may allow the interface controller 202 to determine which one or more subsets of data to return to the host device (e.g., during a retrieval process) and which one or more subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information, other information, or any combination) from the memory array 252 or the scheduler 248-b or both. The cache management circuitry set may also include a second register (e.g., a register 258 which may be a victim page tag (VPT) register) configured to receive storage information (e.g., validity information or dirty information or both) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on or in response to storage information in the register 256, or the register 258, or both.

The engine 246-a may be coupled with the register 256, the register 258, and the schedulers 248. The engine 246-a may be configured to receive storage information from various components and issue commands to the schedulers 248 based on the storage information. For example, if the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, if the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on or in response to commands from the command circuitry 230, the engine 246-a, the engine 246-b, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on or in response to commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204.

In either mode, the interface controller 202 may first check to see if the volatile memory 204 has memory cells available to store the data. To do so, the command circuitry 230 may reference the memory array 252 (e.g., using a set of the memory address bits) to determine whether one or more of then sets (e.g., row) of volatile memory cells associated with the memory address are empty (e.g., store random or invalid data). For example, the command circuitry 230 may determine whether one or more of the n sets (e.g., rows) of volatile memory cells is available (or is unavailable) based on tag information and validity information stored in the memory array 252. In some cases, a set of volatile memory cells in the volatile memory 204 may be referred to as a line, cache line, or row.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of the n associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-*b* based on or in response to dirty information transferred from the memory array 254 to the register 258 during the eviction process.

In another example, the interface controller 202 may receive a command, such as a retrieval command, from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets (e.g., rows) of volatile memory cells associated with the memory address stores the requested data (e.g., whether one or more of the n sets of volatile memory cells associated with the memory address stores or do not store the requested data). If the requested data is stored in the volatile memory 204, the interface controller 202 may transfer the requested data to the buffer 218 for transmission to the host device over the data bus 260.

If the requested data is not stored in the volatile memory 204 (e.g., the requested data may be stored in the non-volatile memory 206 or another location), the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells is available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

Thus, the memory subsystem 200 may operate the volatile memory 204 as a cache for the non-volatile memory 206, which may allow the memory subsystem 110 to interface with the host device through the volatile memory 204 while providing the advantages of the non-volatile memory 206. However, operating the volatile memory 204 as a cache may prevent the memory subsystem 200 from satisfying requests from a host device with deterministic latency, e.g., because some requests are satisfied by the volatile memory 204—which has relatively short latency for access operations—and others are satisfied by the non-volatile memory 206—which has relative long latency for access operations. To provide deterministic latency to the host device, among other advantages, the memory subsystem 200 may operate one or more portions of the volatile memory 204 in the scratchpad mode and one or more portions, such as one or more remaining portions in some examples, in the cache mode.

Figure 3:
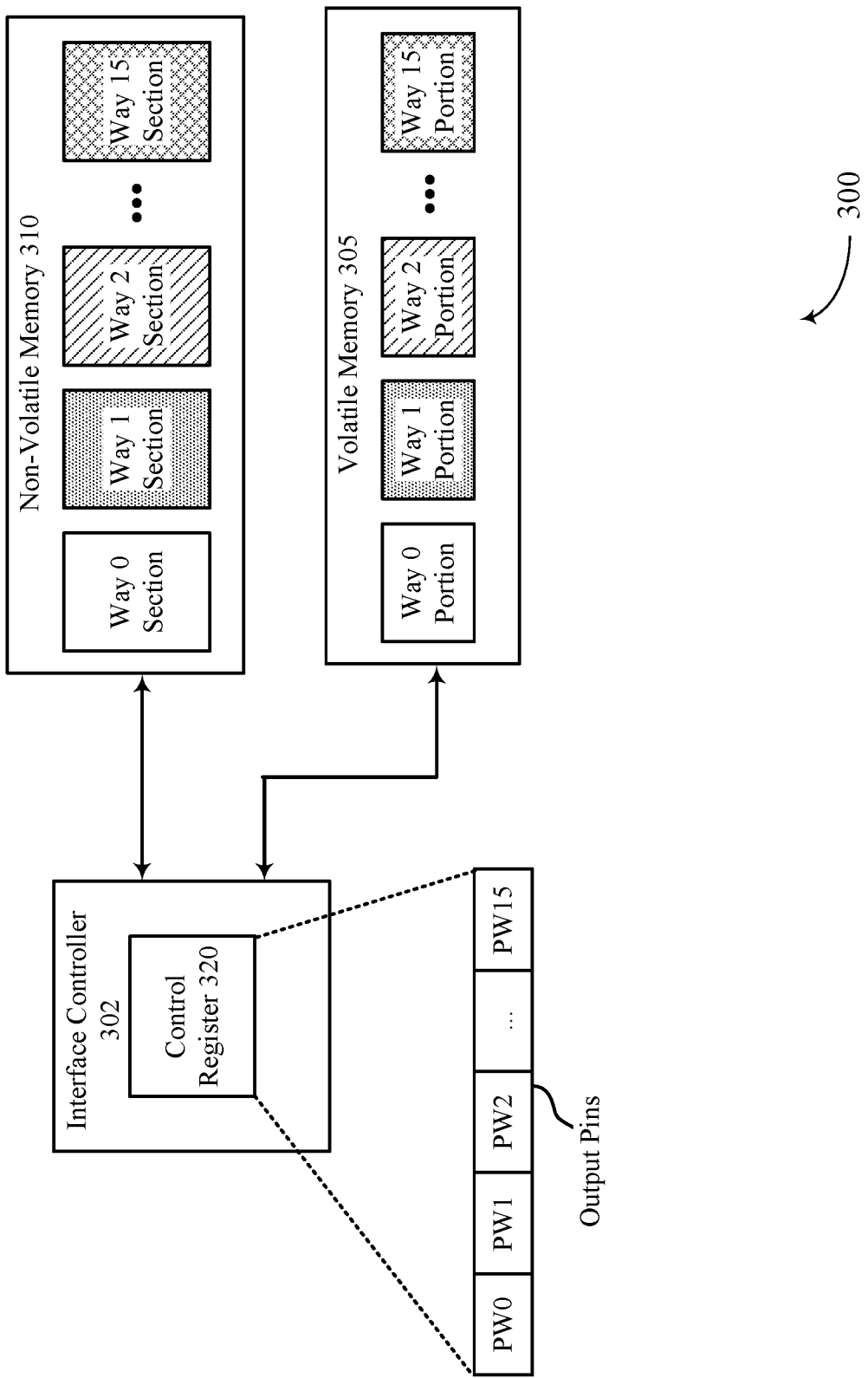
FIG. 3 illustrates an example of a device that supports scratchpad memory in a cache in accordance with examples as disclosed herein.

FIG. 3 illustrates an example of a device 300 that supports scratchpad memory in a cache in accordance with examples as disclosed herein. The device 300 may be an example of the memory subsystem 110 as described with reference to FIG. 1 or the memory subsystem 200 as described with reference to FIG. 2. The device may include an interface controller 302, a volatile memory 305, and a non-volatile memory 310, which may be coupled with one another via one or more transmission lines, buses, or both. The interface controller 302 may also include one or more control registers 320. As described herein, the device 300 may operate different portions of the volatile memory 305 in different operating modes (e.g., a scratchpad mode and a cache mode). The device 300 may also dynamically change the operating mode of one or more portions of the volatile memory 305 (e.g., based on or in response to the control register 320 or one or more other conditions). In some examples the scratchpad mode and the cache mode may be referred to as a first mode and a second mode.

The device 300 is illustrated and described with reference to certain configurations of the volatile memory 305 and the non-volatile memory 310. However, other configurations are also contemplated.

The volatile memory 305 may include multiple banks (e.g., sixteen banks) and may be conceptually or logically divided into portions that include rows from each of the banks (or from one or more of the banks). For example, a portion may include x total rows made up of y rows (e.g., 250 rows) from each bank (or from one or more of the banks). Each portion may be associated with a respective Way identifier (ID) that distinguishes that portion from other portions. Thus, the portions may be denoted Way 0 portion through Way 15 portion (in a sixteen Way example). Each Way may be associated with a corresponding section of the non-volatile memory 310, which may include the rows of the non-volatile memory 310 that are permitted to be used for eviction procedures and fill procedures for the portion of the volatile memory 305 associated with that Way. As an example, the interface controller 302 may perform eviction procedures and fill procedures for memory cells in the Way 0 portion of the volatile memory 305 using memory cells in the Way 0 section of the non-volatile memory 310. The terms portion and section may be used interchangeably, along with other suitable terminology such as region, subsection, subset, or fraction, or any combination thereof.

Like the volatile memory 305, the non-volatile memory 310 may include multiple banks (e.g., sixteen banks) and may be conceptually or logically divided into sections that include rows from each of the banks or from one or more of the banks. Each section may be associated with a respective Way ID that distinguishes that section from other sections. Thus, the sections may be denoted Way 0 section through Way 15 section (in a sixteen Way example). In some examples, the sections of the non-volatile memory 310 may be further divided into (or logically composed of) chunks of memory cells referred to as slices. Portions and sections that are associated with the same Way ID are illustrated in FIG. 3 with the same shading pattern.

The interface controller 302 may operate one or more of the portions in the volatile memory 305 in the scratchpad mode to provide deterministic latency to a host device and may operate other portions (e.g., the remaining portions) in the cache mode to provide other advantages (e.g., the advantages of the non-volatile memory 310 as the primary memory). The interface controller 302 may operate the volatile memory 305 and the non-volatile memory 310 by sending commands to the volatile memory 305 and the non-volatile memory 310 as described with reference to FIGS. 1 and 2.

As an example of split modality, the interface controller 302 may operate the Way 0 portion and the Way 2 portion in the scratchpad mode and may operate some or all of the remaining portions in the cache mode. If a portion is operated in the scratchpad mode, the interface controller 302 may satisfy requests (e.g., from the host device) associated with that portion directly using the volatile memory 305 and may avoid (for those requests) interactions with the non-volatile memory 310, such as eviction procedures and fill procedures, among others.

In some examples, the interface controller 302 may expand or collapse the size of the scratchpad by changing the operating mode of one or more portions (which may be referred to as adding or removing portions from the scratchpad). For example, continuing the foregoing discussion, the interface controller 302 may increase the size of the scratchpad from two portions to three portions by changing the operating mode of the Way 1 portion from the cache mode to the scratchpad mode. As another example, the interface controller 4302 may decrease the size of the scratchpad from two portions to one portion by changing the operating mode of the Way 0 portion from the scratchpad mode to the cache mode.

The interface controller 302 may operate the portions based on the output pins of the control register 320, which may indicate the operating modes of the portions. The interface controller 302 may monitor the state of the output pins of the control register 320, each of which may be associated with a respective portion of the volatile memory 305. For example, output pin PW0 may be associated with the Way 0 portion, output pin PW1 may be associated with the Way 1 portion, and so on and so forth. A first state of an output pin (e.g., a logic 0) may be associated with (e.g., indicate, represent) a first operating mode (e.g., the cache mode) and a second state of an output pin (e.g., a logic 1) may be associated with a second operating mode (e.g., the scratchpad mode). So, the interface controller 302 may operate each portion in the operating mode associated with the current state of the output pin associated with that portion.

In some examples, the interface controller 302 may adjust the size of the scratchpad (and thus the size of the cache) based on the output pins of the control register 320, which may be updated in accordance with control signals received from the host device. For example, if the interface controller 302 receives control signaling from the host device that changes the state of an output pin from the first state to the second state, the interface controller 302 may change the operating mode of the portion from the cache mode to the scratchpad mode. Conversely, if the interface controller 302 receives signaling from the host device that changes the state of an output pin from the second state to the first state, the interface controller 302 may change the operating mode of the portion from the scratched mode to the cache mode.

In some examples, the output pins of the control register 320 may be the output pins of flip-flop circuits. An output pin may also be referred to as a control pin or other suitable terminology, and the state of an output pin may also be referred to as a bit value, a flag value, logical value, voltage value, or other suitable terminology.

In addition to providing deterministic latency, use of one or more portions as a scratchpad may provide power savings relative to other techniques. For example, if portions of the volatile memory 305 are operated in the scratchpad mode, the interface controller 302 may conserve power by powering down sections of the non-volatile memory 310 that are associated those portions. Such a technique may be possible because the scratchpad mode is independent of the non-volatile memory 310, meaning that requests from the host device that implicate the scratchpad portions are satisfied without accessing the non-volatile memory 310 as part of the satisfaction (of course, the non-volatile memory 310 may still be accessed to satisfy request that implicate the cache portions of the volatile memory 305). So, while the Way n portion is operated in the scratchpad mode, the Way n section of the non-volatile memory 310 may be powered down, thereby conserving power.

Figure 4:
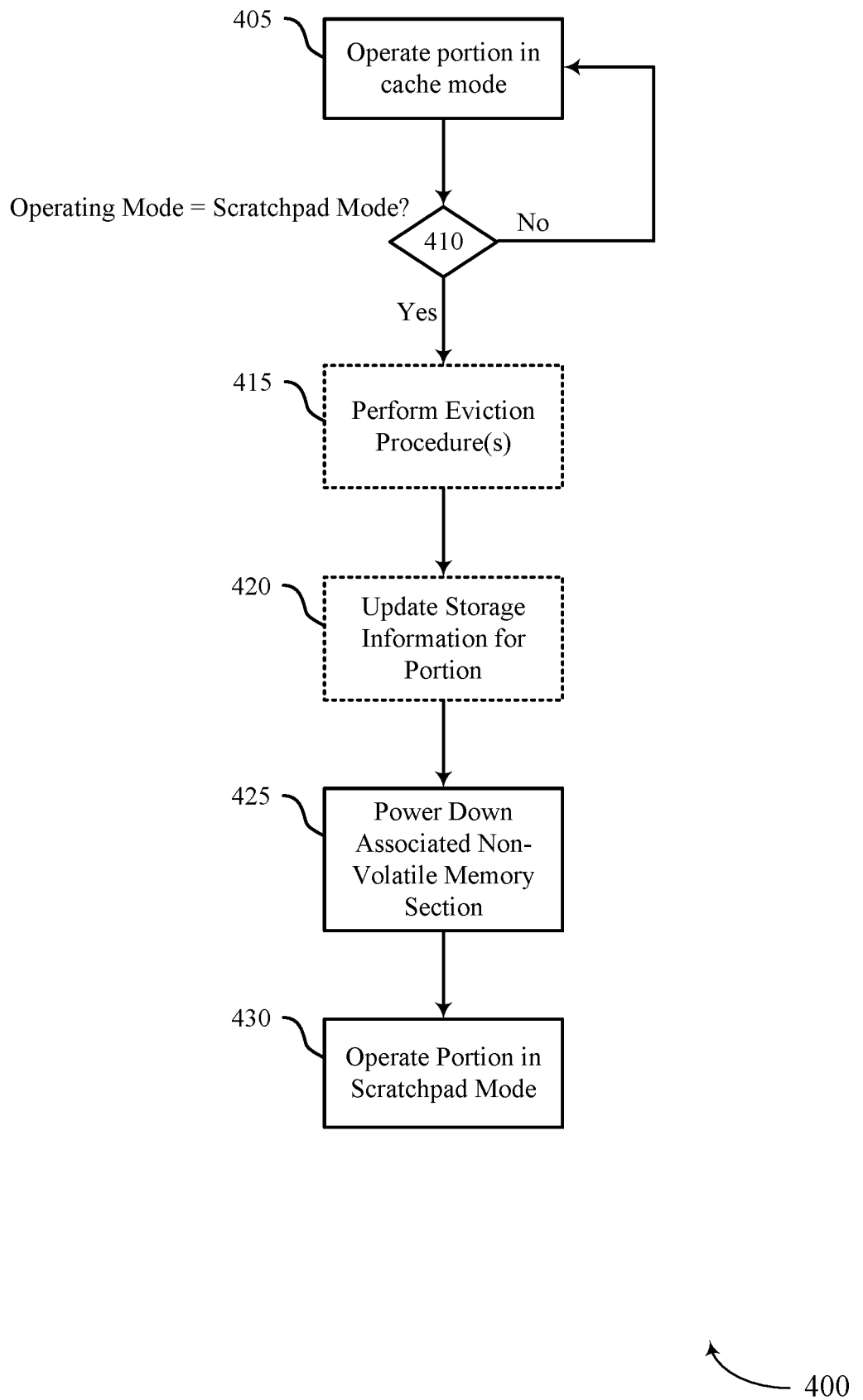
FIG. 4 illustrates an example of a process flow that supports scratchpad memory in a cache in accordance with examples as disclosed herein.

FIG. 4 illustrates an example of a process flow 400 that supports scratchpad memory in a cache in accordance with examples as disclosed herein. Process flow 400 may be implemented by a memory subsystem 110 or interface controller 115 as described with reference to FIG. 1, a memory subsystem 200 or interface controller 202 as described with reference to FIG. 2, or a device 300 or interface controller 302 as described with reference to FIG. 3. However, other types of devices may implement process flow 400. The process flow 400 may illustrate the operations of a device that dynamically increases the size of a scratchpad in a volatile memory.

For ease of reference, the process flow 400 is described with reference to a device. For example, aspects of the process flow 400 may be implemented by a device that includes a volatile memory and a non-volatile memory. Additionally or alternatively, aspects of the process flow 400 may be implemented as instructions stored in memory (e.g., firmware stored in the volatile memory 120 or the non-volatile memory 125 or both). For example, the instructions, if executed by a controller, may cause the controller to perform the operations of the process flow 400.

At 405, a portion of the volatile memory may be operated in the cache mode. For example, the device (e.g., via the interface controller 302) may operate the Way 0 portion in the cache mode. The Way 0 portion may be operated in the cache mode based on or in response to the state of the output pin associated with the Way 0 portion (e.g., output pin PW0) indicating the cache mode. Operating the Way 0 portion in the cache mode may include using the non-volatile memory to satisfy certain requests (e.g., those that target volatile memory cells in the Way 0 portion) that are misses and using eviction procedures and fill procedures to move data between the Way 0 portion and the non-volatile memory. Additionally, operating the Way 0 portion in the cache mode may include updating storage information (e.g., validity information, dirty information, tag information) for rows of the Way 0 portion as data is read from, and written to, those rows. The storage information may also be referred to as metadata and may facilitate the operation of the volatile memory 305 in the cache mode (e.g., by enabling eviction procedures and fill procedures, among other procedures).

At 410, it may be determined whether the operating mode of the portion is the scratchpad mode. For example, the device may determine whether the state of the output pin associated with the Way 0 portion is set to the first state associated with the cache mode or is set to the second state associated with the scratchpad mode. The interface controller 302 may determine the operating mode of the Way 0 portion by monitoring (e.g., continuously, intermittently, periodically) the state of the output pin associated with the Way 0 portion. In some examples, the interface controller 302 may change the state of the output pin before the operations at 410 (e.g., based on or in response to control signaling from a host device). The host device may determine to change the operating mode of the Way 0 portion based on or in response to, for example, a latency demand, an expected access frequency, or another metric of a set of data to be stored in the Way 0 portion. Changing the state of an output pin may also be referred to as masking the output pin.

If, at 410, it is determined that the operating mode of the portion is the cache mode, the device may return to 405 and continue to operate the portion in the cache mode. If, at 410, it is determined that the operating mode of the portion is the scratchpad mode, the device may proceed to 415.

At 415, one or more eviction procedures may be performed. For example, the device may perform one or more eviction procedures for the Way 0 portion. The eviction procedures may be performed as part of the cache mode and before the Way 0 portion is operated in the scratchpad mode at 420. The eviction procedure(s) may be performed to save data (e.g., dirty data) from the Way 0 portion in the non-volatile memory 310 so that the data can be accessed quickly if the Way 0 portion is later returned to the cache mode. As an example, dirty data from one or more rows of the Way 0 portion may be stored in the Way 0 section associated with the Way 0 portion. At 420, storage information for the portion may be updated based on or in response to the operations at 415.

In some examples, the device may perform the eviction procedure(s) based on or in response to one or more signals from the host device indicating that data in the Way 0 portion is to be preserved. If the host device does not indicate preservation of the data, the device may discard (e.g., write over) the data without first saving the data to the non-volatile memory 310.

At 425, the section of the non-volatile memory associated with the portion of the volatile memory may be powered down. For example, the device may power down the Way 0 section of the non-volatile memory 310 (e.g., to conserve power) because the device does not access the Way 0 section while the Way 0 portion is operated in the scratchpad mode. Powering down a section may include disconnecting components of the portion from one or more power sources or operating the portion in a low power mode.

At 430, the portion may be operated in the scratchpad mode. For example, the device may operate the Way 0 portion in the scratchpad mode based on or in response to the state of the output pin indicating the scratchpad mode. Operating the portion in the scratchpad mode may include using the portion to satisfy requests that target the portion and avoiding interactions (e.g., eviction procedures, fill procedures) with the non-volatile memory to satisfy those requests. Because data in the portion is not saved to the non-volatile memory during operation in the scratchpad mode, requests from the host device that target the portion are guaranteed to be hits, which allows the interface controller 302 to satisfy the requests using the volatile memory (and thus provide deterministic latency). Operating the portion in the scratchpad mode may also include maintaining the storage information for the portion as it existed upon entrance into the scratchpad mode (or, put another way, upon exit of the cache mode).

Thus, the size of the scratchpad in the volatile memory may be increased by changing the operating mode of a portion from the cache mode to the scratchpad mode.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
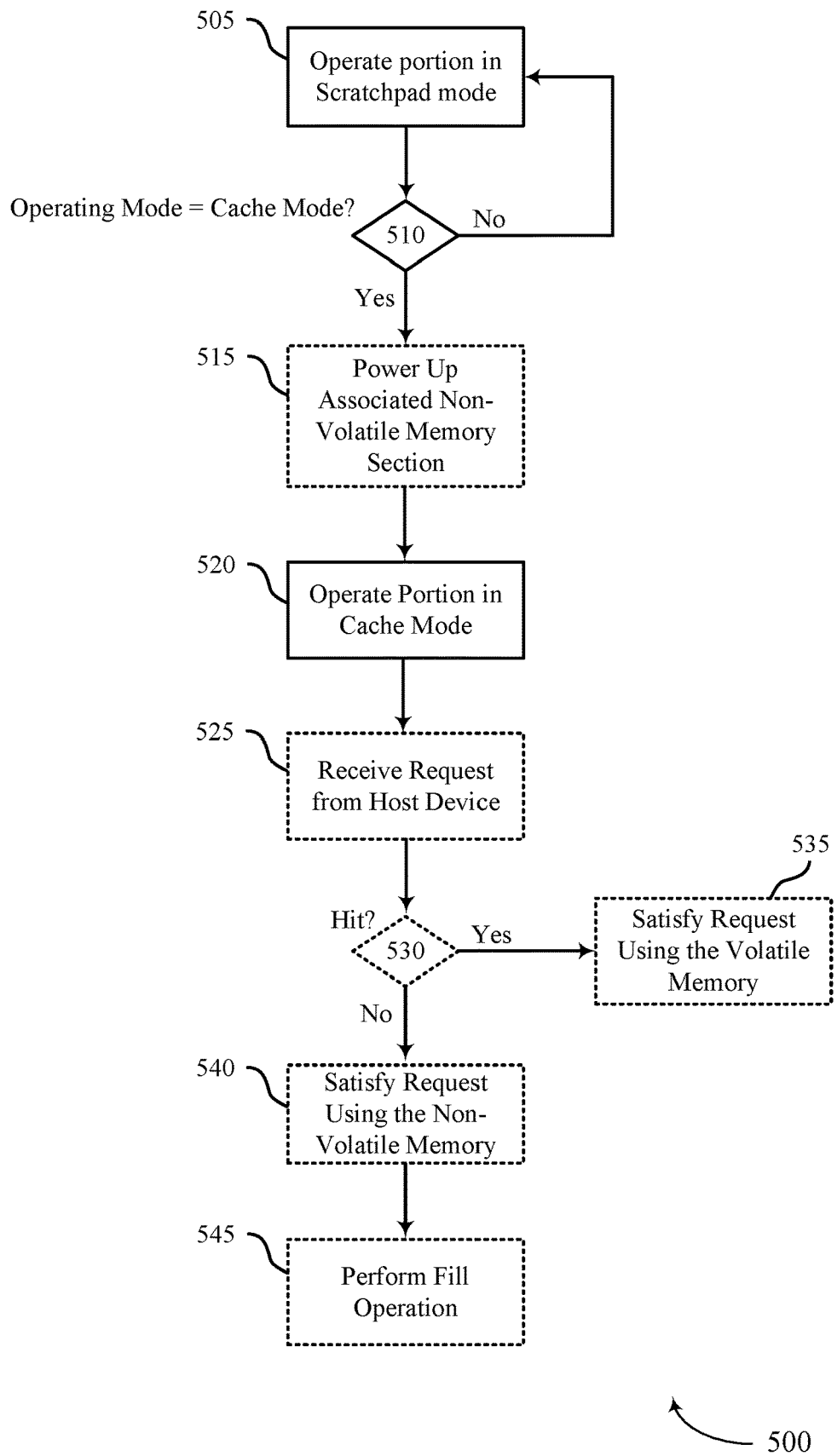
FIG. 5 illustrates an example of a process flow that supports scratchpad memory in a cache in accordance with examples as disclosed herein.

FIG. 5 illustrates an example of a process flow 500 that supports scratchpad memory in a cache in accordance with examples as disclosed herein. Process flow 500 may be implemented by a memory subsystem 110 or interface controller 115 as described with reference to FIG. 1, a memory subsystem 200 or interface controller 202 as described with reference to FIG. 2, or a device 300 or interface controller 302 as described with reference to FIG. 3. However, other types of devices may implement process flow 500. The process flow 500 may illustrate the operations of a device that dynamically decreases the size of a scratchpad in a volatile memory.

For ease of reference, the process flow 500 is described with reference to a device. For example, aspects of the process flow 500 may be implemented by a device that includes a volatile memory and a non-volatile memory. Additionally or alternatively, aspects of the process flow 500 may be implemented as instructions stored in memory (e.g., firmware stored in the volatile memory 120 or the non-volatile memory 125 or both). For example, the instructions, if executed by a controller, may cause the controller to perform the operations of the process flow 500.

At 505, a portion of the volatile memory may be operated in the scratchpad mode. For example, the device may (e.g. via, interface controller 302) operate the Way 0 portion in the scratchpad mode based on or in response to the state of the output pin indicating the scratchpad mode. Operating the portion in the scratchpad mode may include using the portion to satisfy requests that target the portion and avoiding interactions (e.g., eviction procedures, fill procedures) with the non-volatile memory to satisfy those requests. Operating the portion in the scratchpad mode may also include maintaining the storage information for the portion as it existed upon entrance into the scratchpad mode (or, put another way, upon exit of the cache mode).

At 510, it may be determined whether the operating mode of the portion is the cache mode. For example, the device may determine whether the state of the output pin associated with the Way 0 portion is set to the first state associated with the cache mode or is set to the second state associated with the scratchpad mode. The interface controller 302 may determine the operating mode of the Way 0 portion by monitoring (e.g., continuously, intermittently, periodically) the state of the output pin associated with the Way 0 portion. In some examples, the interface controller 302 may change the state of the output pin before the operations at 510 (e.g., based on or in response to control signaling from a host device). The host device may determine to change the operating mode of the Way 0 portion based on or in response to, for example, a latency demand, an expected access frequency, or another metric of a set of data to be stored in the Way 0 portion.

If, at 510, it is determined that the operating mode of the portion is the scratchpad mode, the device may return to 505 and continue to operate the portion in the cache mode. If, at 510, it is determined that the operating mode of the portion is the cache mode, the device may proceed to 515.

At 515, the section of the non-volatile memory associated with the portion may be powered up. For example, the device may power up the Way 0 section so that eviction procedures and fill procedures, among others, can be performed for the portion during operation in the cache mode. Powering up a section may include connecting components in that section to one or more power sources or transitioning from a low power mode to a higher power mode.

At 520, the portion may be operated in the cache mode. For example, the device may operate the Way 0 portion in the cache mode based on or in response to the state of the output pin indicating the cache mode. Operating the Way 0 portion in the cache mode may include using the non-volatile memory to satisfy certain requests (e.g., those that target volatile memory cells in the Way 0 portion) that are misses and using eviction procedures and fill procedures to move data between the Way 0 portion and the non-volatile memory. Additionally, operating the Way 0 portion in the cache mode may include updating storage information (e.g., validity information, dirty information, tag information) for rows of the Way 0 portion as data is read from, and written to, those rows.

If the portion is operated in the cached mode, the device may determine the hit or miss status of a request to determine which memory to use to satisfy the request. As an example, at 525, a request from the host device may be received. For example, the device may receive a read request that targets memory cells in the Way 0 portion. At 530, it may be determined whether the read request is a hit or a miss. If, at 530, it is determined that the read request is a hit, the device may proceed to 535 and satisfy the request using the Way 0 portion of the volatile memory. A read request may be a hit if the read request targets (e.g., is associated with, indicates) data stored in the volatile memory. If, at 530, it is determined that the read request is a miss, the device may proceed to 540. A read request may be a miss it the read request targets data that is absent from the volatile memory.

At 540, the read request may be satisfied using the non-volatile memory. For example, the device may read the data targeted by the read request from the non-volatile memory and communicate that data to the host device. At 545, a fill operation may be performed (e.g., so that the data can be quickly communicated from the volatile memory to the host device in the event of a subsequent read request for the data). For example, the device may store data from the non-volatile memory to the volatile memory. The data implicated in the fill operation may be data targeted by the read request.

If the request received at 525 is a write request that targets memory cells in the Way 0 portion, it may be determined at 530 whether the write request is a hit or a miss. If, at 530, it is determined that the write request is a hit, the device may proceed to 535 and satisfy the request using the Way 0 portion of the volatile memory. A write request may be a hit if the write request targets (e.g., is associated with, indicates) data stored in the volatile memory. If, at 530, it is determined that the write request is a miss, the device may proceed to 545 (skipping 540) and perform a fill procedure. A write request may be a miss it the write request targets data that is absent from the volatile memory. After performing the fill procedure at 545, the device may satisfy the write request by updating some of all of the data in the with dirty data associated with the write request.

Thus, the size of the scratchpad in the volatile memory may be decreased by changing the operating mode of a portion from the cache mode to the scratchpad mode.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 6:
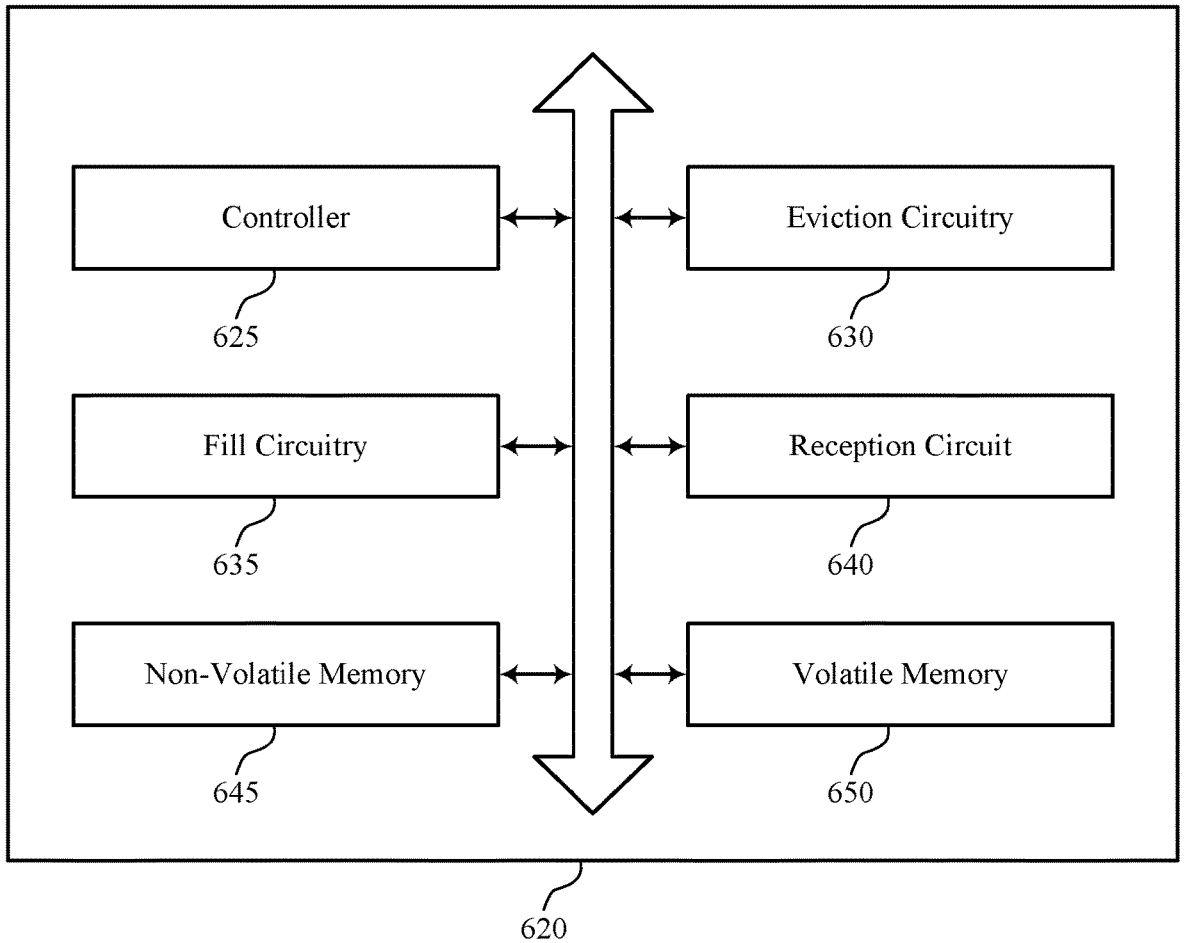
FIG. 6 shows a block diagram of an interface controller that supports scratchpad memory in a cache in accordance with examples as disclosed herein.

FIG. 6 shows a block diagram 600 of an interface controller 620 that supports scratchpad memory in a cache in accordance with examples as disclosed herein. The interface controller 620 may be an example of aspects of an interface controller as described with reference to FIGS. 1 through 5. The interface controller 620, or various components thereof, may be an example of means for performing various aspects of scratchpad memory in a cache as described herein. For example, the interface controller 620 may include a controller 625, an eviction circuitry 630, a fill circuitry 635, a reception circuit 640, a non-volatile memory 645, a volatile memory 650, or any combination thereof. Each of these components may communicate, directly or indirectly, with one another (e.g., via one or more buses).

The controller 625 may be or include logic, circuitry, a processor, a controller, or other components capable of performing the functions described herein. The eviction circuitry 630 may be or include a combination of logic, circuits, controllers, registers, buffers, data buses, data bus interfaces, components that form data paths, or other components capable of performing the functions described herein. The fill circuitry 635 may be or include a combination of logic, circuits, controllers, registers, buffers, data buses, data bus interfaces, components that form data paths, or other components capable of performing the functions described herein. The reception circuit 640 may be or include a data bus, a data bus interface, logic, circuitry, a processor, a controller, or other components capable of performing the functions described herein. The non-volatile memory 645 may be an example of a non-volatile memory as describe herein and may or include a memory die, a memory array, a memory device, or other components capable of performing the functions described herein. The volatile memory 650 may be an example of the volatile memory described herein and may be or include a memory die, a memory array, a memory device, or other components capable of performing the functions described herein.

The controller 625 may be configured as or otherwise support a means for operating a portion of a volatile memory in a cache mode having non-deterministic latency for satisfying requests from a host device, the cache mode associated with data movement between the portion and a non-volatile memory. In some examples, the controller 625 may be configured as or otherwise support a means for monitoring an output pin of a register in the memory device, the output pin associated with the portion and indicative of an operating mode of the portion. In some examples, the controller 625 may be configured as or otherwise support a means for determining, based at least in part on monitoring the output pin of the register, whether to change the operating mode of the portion from the cache mode to a scratchpad mode having deterministic latency for satisfying requests from the host device, the scratchpad mode for operating the portion independent of the non-volatile memory. In some examples, the controller 625 may be configured as or otherwise support a means for operating the portion of the volatile memory in the scratchpad mode based at least in part on the determining to change the operating mode of the portion.

In some examples, to support operating the portion of the volatile memory in the cache mode, the eviction circuitry 630 may be configured as or otherwise support a means for performing eviction procedures to store data from the portion in the non-volatile memory. In some examples, to support operating the portion of the volatile memory in the cache mode, the fill circuitry 635 may be configured as or otherwise support a means for performing fill procedures to store data from the non-volatile memory in the portion.

In some examples, to support operating the portion of the volatile memory in the scratchpad mode, the controller 625 may be configured as or otherwise support a means for refraining from performing eviction procedures and fill procedures.

In some examples, to support operating the portion of the volatile memory in the cache mode, the controller 625 may be configured as or otherwise support a means for updating metadata for operating the portion in the cache mode and for enabling the data movement between the portion and the non-volatile memory.

In some examples, the reception circuit 640 may be configured as or otherwise support a means for receiving, from the host device, a signal that changes a state of the output pin from a first state associated with the cache mode to a second state associated with the scratchpad mode, where the determination is based at least in part on the state of the output pin changing from the first state to the second state.

In some examples, the non-volatile memory 645 may be configured as or otherwise support a means for storing a set of data from the portion of the volatile memory in a portion of the non-volatile memory based at least in part on determining to change operating modes and before operating the portion in the scratchpad mode. In some examples, the non-volatile memory 645 may be configured as or otherwise support a means for powering down the portion of the non-volatile memory after storing the set of data and based at least in part on determining to operate the portion of the volatile memory in the scratchpad mode.

In some examples, the controller 625 may be configured as or otherwise support a means for determining whether to operate the portion of the volatile memory in the cache mode after operating the portion in the scratchpad mode. In some examples, the volatile memory 650 may be configured as or otherwise support a means for storing, in the portion after determining to operate the portion in the cache mode, a set of data from the non-volatile memory based at least in part on a request for the set of data from the host device and during operation of the portion in the cache mode.

In some examples, the controller 625 may be configured as or otherwise support a means for determining whether a state of a second output pin of the register has changed from a first state associated with the cache mode to a second state associated with the scratchpad mode. In some examples, the controller 625 may be configured as or otherwise support a means for changing an operating mode of a second portion associated with the second output pin from the cache mode to the scratchpad mode based at least in part on determining that the state of the second output pin has changed from the first state to the second state.

In some examples, the controller 625 may be configured as or otherwise support a means for determining whether a state of a second output pin of the register has changed to a first state associated with the cache mode from a second state associated with the scratchpad mode. In some examples, the controller 625 may be configured as or otherwise support a means for changing an operating mode of a second portion associated with the second output pin from the scratchpad mode to the cache mode based at least in part on determining that the state of the second output pin has changed to the first state from the second state.

In some examples, the portion includes rows from multiple banks of the volatile memory.

In some examples, the controller 625 may be configured as or otherwise support a means for operating a portion of the volatile memory in a scratchpad mode having deterministic latency for satisfying requests from a host device, the scratchpad mode for operating the portion independent of the non-volatile memory. In some examples, the controller 625 may be configured as or otherwise support a means for monitoring an output pin of a register in the apparatus, the output pin associated with the portion and indicative of an operating mode of the portion. In some examples, the controller 625 may be configured as or otherwise support a means for determining, based at least in part on monitoring the output pin of the register, whether to change the operating mode of the portion from the scratchpad mode to a cache mode having non-deterministic latency for satisfying requests from the host device, the cache mode associated with data movement between the portion and the non-volatile memory. In some examples, the controller 625 may be configured as or otherwise support a means for operating the portion of the volatile memory in the cache mode based at least in part on the determining to change the operating mode of the portion.

In some examples, the reception circuit 640 may be configured as or otherwise support a means for receiving, from the host device, a signal that changes a state of the output pin to a first state associated with the cache mode from a second state associated with the scratchpad mode, where the determination is based at least in part on the state of the output pin changing to the first state from the second state.

Figure 7:
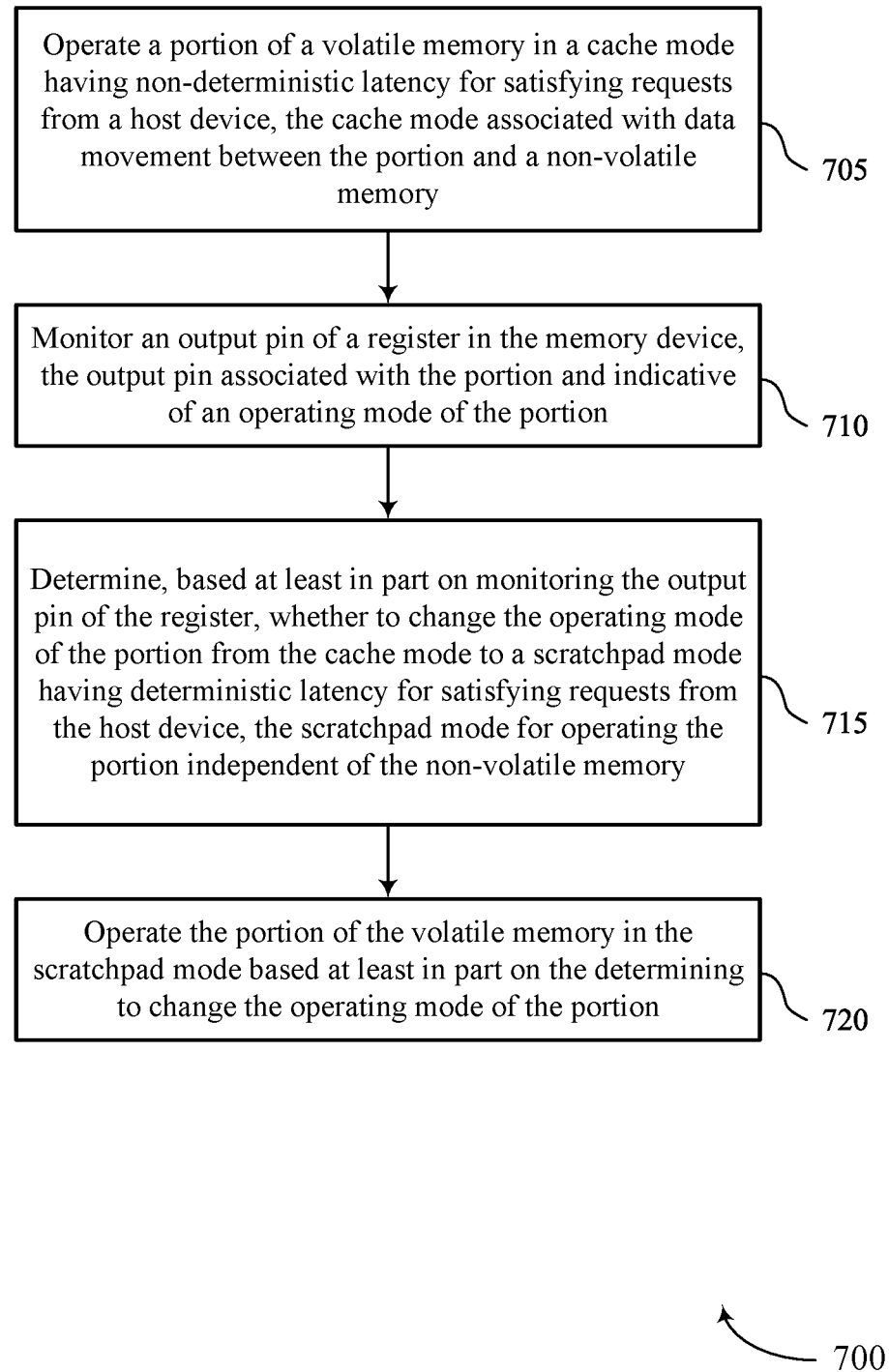
FIGS. 7 and 8 show flowcharts illustrating a method or methods that support scratchpad memory in a cache in accordance with examples as disclosed herein.

FIG. 7 shows a flowchart illustrating a method 700 that supports scratchpad memory in a cache in accordance with examples as disclosed herein. The operations of method 700 may be implemented by an interface controller or its components as described herein. For example, the operations of method 700 may be performed by an interface controller as described with reference to FIGS. 1 through 6. In some examples, an interface controller may execute a set of instructions to control the functional elements of the device to perform the described functions. Additionally or alternatively, the interface controller may perform aspects of the described functions using special-purpose hardware.

At 705, the method may include operating a portion of a volatile memory in a cache mode having non-deterministic latency for satisfying requests from a host device, the cache mode associated with data movement between the portion and a non-volatile memory. The operations of 705 may be performed in accordance with examples as disclosed herein. In some examples, aspects of the operations of 705 may be performed by a controller 625 as described with reference to FIG. 6.

At 710, the method may include monitoring an output pin of a register in the memory device, the output pin associated with the portion and indicative of an operating mode of the portion. The operations of 710 may be performed in accordance with examples as disclosed herein. In some examples, aspects of the operations of 710 may be performed by a controller 625 as described with reference to FIG. 6.

At 715, the method may include determining, based at least in part on monitoring the output pin of the register, whether to change the operating mode of the portion from the cache mode to a scratchpad mode having deterministic latency for satisfying requests from the host device, the scratchpad mode for operating the portion independent of the non-volatile memory. The operations of 715 may be performed in accordance with examples as disclosed herein. In some examples, aspects of the operations of 715 may be performed by a controller 625 as described with reference to FIG. 6.

At 720, the method may include operating the portion of the volatile memory in the scratchpad mode based at least in part on the determining to change the operating mode of the portion. The operations of 720 may be performed in accordance with examples as disclosed herein. In some examples, aspects of the operations of 720 may be performed by a controller 625 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for operating a portion of a volatile memory in a cache mode having non-deterministic latency for satisfying requests from a host device, the cache mode associated with data movement between the portion and a non-volatile memory, monitoring an output pin of a register in the memory device, the output pin associated with the portion and indicative of an operating mode of the portion, determining, based at least in part on monitoring the output pin of the register, whether to change the operating mode of the portion from the cache mode to a scratchpad mode having deterministic latency for satisfying requests from the host device, the scratchpad mode for operating the portion independent of the non-volatile memory, and operating the portion of the volatile memory in the scratchpad mode based at least in part on the determining to change the operating mode of the portion.

In some examples of the method 700 and the apparatus described herein, operating the portion of the volatile memory in the cache mode may include operations, features, circuitry, logic, means, or instructions for performing eviction procedures to store data from the portion in the non-volatile memory and performing fill procedures to store data from the non-volatile memory in the portion.

In some examples of the method 700 and the apparatus described herein, operating the portion of the volatile memory in the scratchpad mode may include operations, features, circuitry, logic, means, or instructions for refraining from performing eviction procedures and fill procedures.

In some examples of the method 700 and the apparatus described herein, operating the portion of the volatile memory in the cache mode may include operations, features, circuitry, logic, means, or instructions for updating metadata for operating the portion in the cache mode and for enabling the data movement between the portion and the non-volatile memory.

Some examples of the method 700 and the apparatus described herein may further include operations, features, circuitry, logic, means, or instructions for receiving, from the host device, a signal that changes a state of the output pin from a first state associated with the cache mode to a second state associated with the scratchpad mode, where the determination may be based at least in part on the state of the output pin changing from the first state to the second state.

Some examples of the method 700 and the apparatus described herein may further include operations, features, circuitry, logic, means, or instructions for storing a set of data from the portion of the volatile memory in a portion of the non-volatile memory based at least in part on determining to change operating modes and before operating the portion in the scratchpad mode and powering down the portion of the non-volatile memory after storing the set of data and based at least in part on determining to operate the portion of the volatile memory in the scratchpad mode.

Some examples of the method 700 and the apparatus described herein may further include operations, features, circuitry, logic, means, or instructions for determining whether to operate the portion of the volatile memory in the cache mode after operating the portion in the scratchpad mode and storing, in the portion after determining to operate the portion in the cache mode, a set of data from the non-volatile memory based at least in part on a request for the set of data from the host device and during operation of the portion in the cache mode.

Some examples of the method 700 and the apparatus described herein may further include operations, features, circuitry, logic, means, or instructions for determining whether a state of a second output pin of the register may have changed from a first state associated with the cache mode to a second state associated with the scratchpad mode and changing an operating mode of a second portion associated with the second output pin from the cache mode to the scratchpad mode based at least in part on determining that the state of the second output pin may have changed from the first state to the second state.

Some examples of the method 700 and the apparatus described herein may further include operations, features, circuitry, logic, means, or instructions for determining whether a state of a second output pin of the register may have changed to a first state associated with the cache mode from a second state associated with the scratchpad mode and changing an operating mode of a second portion associated with the second output pin from the scratchpad mode to the cache mode based at least in part on determining that the state of the second output pin may have changed to the first state from the second state.

In some examples of the method 700 and the apparatus described herein, the portion includes rows from multiple banks of the volatile memory.

Figure 8:
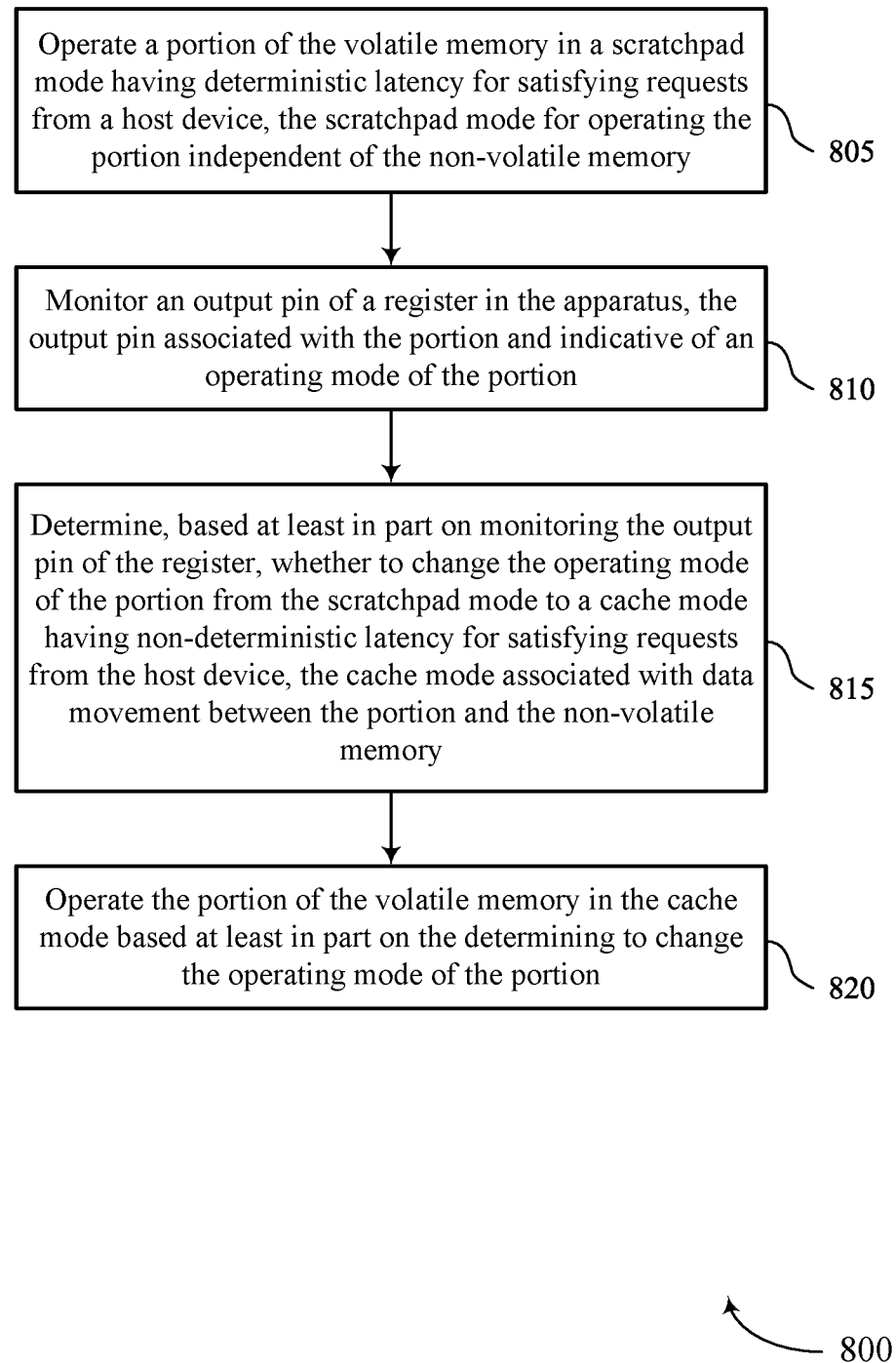

FIG. 8 shows a flowchart illustrating a method 800 that supports scratchpad memory in a cache in accordance with examples as disclosed herein. The operations of method 800 may be implemented by an interface controller or its components as described herein. For example, the operations of method 800 may be performed by an interface controller as described with reference to FIGS. 1 through 6. In some examples, an interface controller may execute a set of instructions to control the functional elements of the device to perform the described functions. Additionally or alternatively, the interface controller may perform aspects of the described functions using special-purpose hardware.

At 805, the method may include operating a portion of the volatile memory in a scratchpad mode having deterministic latency for satisfying requests from a host device, the scratchpad mode for operating the portion independent of the non-volatile memory. The operations of 805 may be performed in accordance with examples as disclosed herein. In some examples, aspects of the operations of 805 may be performed by a controller 625 as described with reference to FIG. 6.

At 810, the method may include monitoring an output pin of a register in the apparatus, the output pin associated with the portion and indicative of an operating mode of the portion. The operations of 810 may be performed in accordance with examples as disclosed herein. In some examples, aspects of the operations of 810 may be performed by a controller 625 as described with reference to FIG. 6.

At 815, the method may include determining, based at least in part on monitoring the output pin of the register, whether to change the operating mode of the portion from the scratchpad mode to a cache mode having non-deterministic latency for satisfying requests from the host device, the cache mode associated with data movement between the portion and the non-volatile memory. The operations of 815 may be performed in accordance with examples as disclosed herein. In some examples, aspects of the operations of 815 may be performed by a controller 625 as described with reference to FIG. 6.

At 820, the method may include operating the portion of the volatile memory in the cache mode based at least in part on the determining to change the operating mode of the portion. The operations of 820 may be performed in accordance with examples as disclosed herein. In some examples, aspects of the operations of 820 may be performed by a controller 625 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for operating a portion of the volatile memory in a scratchpad mode having deterministic latency for satisfying requests from a host device, the scratchpad mode for operating the portion independent of the non-volatile memory, monitoring an output pin of a register in the apparatus, the output pin associated with the portion and indicative of an operating mode of the portion, determining, based at least in part on monitoring the output pin of the register, whether to change the operating mode of the portion from the scratchpad mode to a cache mode having non-deterministic latency for satisfying requests from the host device, the cache mode associated with data movement between the portion and the non-volatile memory, and operating the portion of the volatile memory in the cache mode based at least in part on the determining to change the operating mode of the portion.

Some examples of the method 800 and the apparatus described herein may further include operations, features, circuitry, logic, means, or instructions for receiving, from the host device, a signal that changes a state of the output pin to a first state associated with the cache mode from a second state associated with the scratchpad mode, where the determination may be based at least in part on the state of the output pin changing to the first state from the second state.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a non-volatile memory, a volatile memory, and an interface controller coupled with the non-volatile memory and the volatile memory, the interface controller operable to cause the apparatus to operate a portion of the volatile memory in a cache mode having non-deterministic latency for satisfying requests from a host device, the cache mode associated with data movement between the portion and the non-volatile memory, monitor an output pin of a register in the apparatus, the output pin associated with the portion and indicative of an operating mode of the portion, determine, based at least in part on monitoring the output pin of the register, whether to change the operating mode of the portion from the cache mode to a scratchpad mode having deterministic latency for satisfying requests from the host device, the scratchpad mode for operating the portion independent of the non-volatile memory, and operate the portion of the volatile memory in the scratchpad mode based at least in part on the determining to change the operating mode of the portion In some examples, the apparatus may include perform, during operation of the portion in the cache mode, eviction procedures to store data from the portion in the non-volatile memory and perform, during operation of the portion in the cache mode, fill procedures to store data from the non-volatile memory in the portion.

In some examples, the apparatus may include refrain from performing eviction procedures and fill procedures during operation of the portion in the scratchpad mode.

In some examples of the apparatus, the interface controller may be further operable to cause the apparatus to update, during operation of the portion in the cache mode, metadata for operating the portion in the cache mode and for enabling the data movement between the portion and the non-volatile memory.

In some examples, the apparatus may include receive, from the host device, a signal that changes a state of the output pin from a first state associated with the cache mode to a second state associated with the scratchpad mode, where the determination may be based at least in part on the state of the output pin changing from the first state to the second state.

In some examples, the apparatus may include store a set of data from the portion of the volatile memory in a portion of the non-volatile memory based at least in part on determining to change operating modes and before operating the portion in the scratchpad mode and power down the portion of the non-volatile memory after storing the set of data and based at least in part on determining to operate the portion of the volatile memory in the scratchpad mode.

In some examples, the apparatus may include determine whether to operate the portion of the volatile memory in the cache mode after operating the portion in the scratchpad mode and store, in the portion after determining to operate the portion in the cache mode, a set of data from the non-volatile memory based at least in part on a request for the set of data from the host device and during operation of the portion in the cache mode.

In some examples, the apparatus may include determine whether a state of a second output pin of the register may have changed from a first state associated with the cache mode to a second state associated with the scratchpad mode and change an operating mode of a second portion associated with the second output pin from the cache mode to the scratchpad mode based at least in part on determining that the state of the second output pin may have changed from the first state to the second state.

In some examples, the apparatus may include determine whether a state of a second output pin of the register may have changed to a first state associated with the cache mode from a second state associated with the scratchpad mode and change an operating mode of a second portion associated with the second output pin from the scratchpad mode to the cache mode based at least in part on determining that the state of the second output pin may have changed to the first state from the second state.

In some examples of the apparatus, the portion includes rows from multiple banks of the volatile memory.

Another apparatus is described. The apparatus may include a non-volatile memory, a volatile memory, and an interface controller coupled with the non-volatile memory and the volatile memory, the interface controller operable to cause the apparatus to operate a portion of the volatile memory in a scratchpad mode having deterministic latency for satisfying requests from a host device, the scratchpad mode for operating the portion independent of the non-volatile memory, monitor an output pin of a register in the apparatus, the output pin associated with the portion and indicative of an operating mode of the portion, determine, based at least in part on monitoring the output pin of the register, whether to change the operating mode of the portion from the scratchpad mode to a cache mode having non-deterministic latency for satisfying requests from the host device, the cache mode associated with data movement between the portion and the non-volatile memory, and operate the portion of the volatile memory in the cache mode based at least in part on the determining to change the operating mode of the portion In some examples, the apparatus may include perform, during operation of the portion in the cache mode, eviction procedures to store data from the portion in the non-volatile memory and perform, during operation of the portion in the cache mode, fill procedures to store data from the non-volatile memory in the portion.

In some examples, the apparatus may include refrain from performing eviction procedures and fill procedures during operation of the portion in the scratchpad mode.

In some examples of the apparatus, operating the portion of the volatile memory in the cache mode includes update, during operation of the portion in the cache mode, metadata for operating the portion in the cache mode and for enabling the data movement between the portion and the non-volatile memory.

In some examples, the apparatus may include receive, from the host device, a signal that changes a state of the output pin to a first state associated with the cache mode from a second state associated with the scratchpad mode, where the determination may be based at least in part on the state of the output pin changing to the first state from the second state.

It should be noted that the methods described above describe possible implementations, and that the operations and the steps may be rearranged or otherwise modified and that other implementations are possible. Furthermore, portions from two or more of the methods may be combined.

If used to describe a conditional action or process, the terms "if," "when," "based on," "based at least in part on," and "in response to," may be interchangeable.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method performed by a memory device, comprising:
operating a portion of a volatile memory in a cache mode having non-deterministic latency for satisfying requests from a host device, the cache mode associated with data movement between the portion and a non-volatile memory;
monitoring an output pin of a register in the memory device, the output pin associated with the portion and indicative of an operating mode of the portion;
determining, based at least in part on monitoring the output pin of the register and on a latency demand, an expected access frequency, or both, of a set of data to be stored at the portion of the volatile memory, whether to change the operating mode of the portion from the cache mode to a scratchpad mode having deterministic latency for satisfying requests from the host device, the scratchpad mode for operating the portion independent of the non-volatile memory; and operating the portion of the volatile memory in the scratchpad mode based at least in part on the determining to change the operating mode of the portion.

2. The method of claim 1, wherein operating the portion of the volatile memory in the cache mode comprises:
performing eviction procedures to store data from the portion in the non-volatile memory; and
performing fill procedures to store data from the non-volatile memory in the portion.

3. The method of claim 2, wherein operating the portion of the volatile memory in the scratchpad mode comprises:
refraining from performing eviction procedures and fill procedures.

4. The method of claim 1, wherein operating the portion of the volatile memory in the cache mode comprises:
updating metadata for operating the portion in the cache mode and for enabling the data movement between the portion and the non-volatile memory.

5. The method of claim 1, further comprising:
receiving, from the host device, a signal that changes a state of the output pin from a first state associated with the cache mode to a second state associated with the scratchpad mode, wherein the determination is based at least in part on the state of the output pin changing from the first state to the second state.

6. The method of claim 1, further comprising:
storing the set of data from the portion of the volatile memory in a portion of the non-volatile memory based at least in part on determining to change operating modes and before operating the portion in the scratchpad mode; and
powering down the portion of the non-volatile memory after storing the set of data and based at least in part on determining to operate the portion of the volatile memory in the scratchpad mode.

7. The method of claim 1, further comprising:
determining whether to operate the portion of the volatile memory in the cache mode after operating the portion in the scratchpad mode; and
storing, in the portion after determining to operate the portion in the cache mode, the set of data from the non-volatile memory based at least in part on a request for the set of data from the host device and during operation of the portion in the cache mode.

8. The method of claim 1, further comprising:
determining whether a state of a second output pin of the register has changed from a first state associated with the cache mode to a second state associated with the scratchpad mode; and
changing an operating mode of a second portion associated with the second output pin from the cache mode to the scratchpad mode based at least in part on determining that the state of the second output pin has changed from the first state to the second state.

9. The method of claim 1, further comprising:
determining whether a state of a second output pin of the register has changed to a first state associated with the cache mode from a second state associated with the scratchpad mode; and
changing an operating mode of a second portion associated with the second output pin from the scratchpad mode to the cache mode based at least in part on determining that the state of the second output pin has changed to the first state from the second state.

10. The method of claim 1, wherein the portion comprises rows from multiple banks of the volatile memory.

11. An apparatus, comprising:
a non-volatile memory;
a volatile memory; and
an interface controller coupled with the non-volatile memory and the volatile memory, the interface controller operable to cause the apparatus to:
operate a portion of the volatile memory in a cache mode having non-deterministic latency for satisfying requests from a host device, the cache mode associated with data movement between the portion and the non-volatile memory;
monitor an output pin of a register in the apparatus, the output pin associated with the portion and indicative of an operating mode of the portion;
determine, based at least in part on monitoring the output pin of the register and on a latency demand, an expected access frequency, or both of a set of data to be stored at the portion of the volatile memory, whether to change the operating mode of the portion from the cache mode to a scratchpad mode having deterministic latency for satisfying requests from the host device, the scratchpad mode for operating the portion independent of the non-volatile memory; and
operate the portion of the volatile memory in the scratchpad mode based at least in part on the determining to change the operating mode of the portion.

12. The apparatus of claim 11, wherein the interface controller is further operable to cause the apparatus to:
perform, during operation of the portion in the cache mode, eviction procedures to store data from the portion in the non-volatile memory; and
perform, during operation of the portion in the cache mode, fill procedures to store data from the non-volatile memory in the portion.

13. The apparatus of claim 12, wherein the interface controller is further operable to cause the apparatus to:
refrain from performing eviction procedures and fill procedures during operation of the portion in the scratchpad mode.

14. The apparatus of claim 11, wherein the interface controller is further operable to cause the apparatus to:
update, during operation of the portion in the cache mode, metadata for operating the portion in the cache mode and for enabling the data movement between the portion and the non-volatile memory.

15. The apparatus of claim 11, wherein the interface controller is further operable to cause the apparatus to:
receive, from the host device, a signal that changes a state of the output pin from a first state associated with the cache mode to a second state associated with the scratchpad mode, wherein the determination is based at least in part on the state of the output pin changing from the first state to the second state.

16. The apparatus of claim 11, wherein the interface controller is further operable to cause the apparatus to:
store the set of data from the portion of the volatile memory in a portion of the non-volatile memory based at least in part on determining to change operating modes and before operating the portion in the scratchpad mode; and
power down the portion of the non-volatile memory after storing the set of data and based at least in part on determining to operate the portion of the volatile memory in the scratchpad mode.

17. The apparatus of claim 11, wherein the interface controller is further operable to cause the apparatus to:
- determine whether to operate the portion of the volatile memory in the cache mode after operating the portion in the scratchpad mode; and
- store, in the portion after determining to operate the portion in the cache mode, the set of data from the non-volatile memory based at least in part on a request for the set of data from the host device and during operation of the portion in the cache mode.

18. The apparatus of claim 11, wherein the interface controller is further operable to cause the apparatus to:
- determine whether a state of a second output pin of the register has changed from a first state associated with the cache mode to a second state associated with the scratchpad mode; and
- change an operating mode of a second portion associated with the second output pin from the cache mode to the scratchpad mode based at least in part on determining that the state of the second output pin has changed from the first state to the second state.

19. The apparatus of claim 11, wherein the interface controller is further operable to cause the apparatus to:
- determine whether a state of a second output pin of the register has changed to a first state associated with the cache mode from a second state associated with the scratchpad mode; and
- change an operating mode of a second portion associated with the second output pin from the scratchpad mode to the cache mode based at least in part on determining that the state of the second output pin has changed to the first state from the second state.

20. The apparatus of claim 11, wherein the portion comprises rows from multiple banks of the volatile memory.

21. An apparatus, comprising:
- a non-volatile memory;
- a volatile memory; and
- an interface controller coupled with the non-volatile memory and the volatile memory, the interface controller operable to cause the apparatus to:
  - operate a portion of the volatile memory in a scratchpad mode having deterministic latency for satisfying requests from a host device, the scratchpad mode for operating the portion independent of the non-volatile memory;
  - monitor an output pin of a register in the apparatus, the output pin associated with the portion and indicative of an operating mode of the portion;
  - determine, based at least in part on monitoring the output pin of the register and on a latency demand, an expected access frequency, or both of a set of data to be stored at the portion of the volatile memory, whether to change the operating mode of the portion from the scratchpad mode to a cache mode having non-deterministic latency for satisfying requests from the host device, the cache mode associated with data movement between the portion and the non-volatile memory; and
  - operate the portion of the volatile memory in the cache mode based at least in part on the determining to change the operating mode of the portion.

22. The apparatus of claim 21, wherein the interface controller is further operable to cause the apparatus to:
- perform, during operation of the portion in the cache mode, eviction procedures to store data from the portion in the non-volatile memory; and
- perform, during operation of the portion in the cache mode, fill procedures to store data from the non-volatile memory in the portion.

23. The apparatus of claim 22, wherein the interface controller is further operable to cause the apparatus to:
- refrain from performing eviction procedures and fill procedures during operation of the portion in the scratchpad mode.

24. The apparatus of claim 21, wherein the interface controller is further operable to cause the apparatus to:
- update, during operation of the portion in the cache mode, metadata for operating the portion in the cache mode and for enabling the data movement between the portion and the non-volatile memory.

25. The apparatus of claim 21, wherein the interface controller is further operable to cause the apparatus to:
- receive, from the host device, a signal that changes a state of the output pin to a first state associated with the cache mode from a second state associated with the scratchpad mode, wherein the determination is based at least in part on the state of the output pin changing to the first state from the second state.

* * * * *